G. C. LETHERMAN.
CULTIVATOR.
APPLICATION FILED SEPT. 11, 1911.
1,010,276.
Patented Nov. 28, 1911.
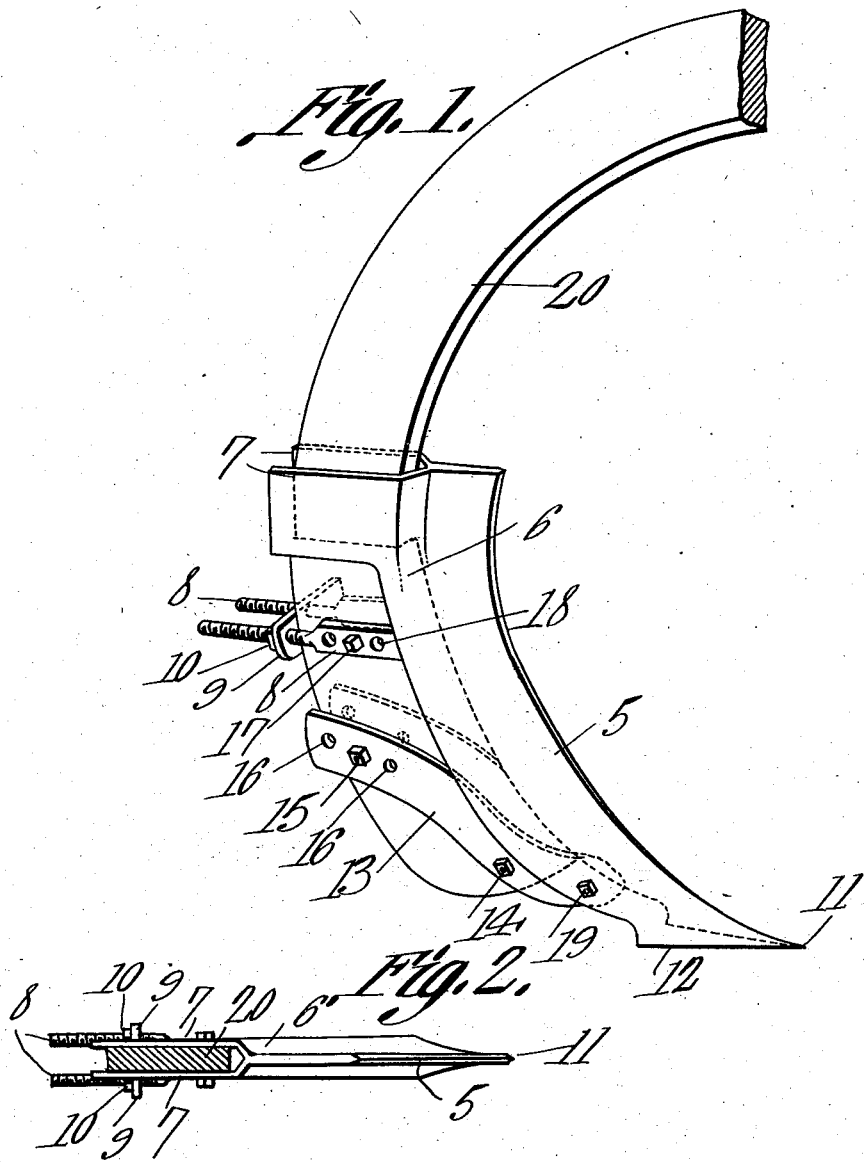
Witnesses
George C. Letherman,
Inventor
by C. A. Snow & Co.
Attorneys

UNITED STATES PATENT OFFICE.

GEORGE C. LETHERMAN, OF ARCADIA, NEBRASKA.

CULTIVATOR.

1,010,276. Specification of Letters Patent. Patented Nov. 28, 1911.

Application filed September 11, 1911. Serial No. 648,754.

*To all whom it may concern:*

Be it known that I, GEORGE C. LETHERMAN, a citizen of the United States, residing at Arcadia, in the county of Valley and State of Nebraska, have invented a new and useful Cultivator, of which the following is a specification.

This invention relates to cultivators, and has for its object to provide an implement for cutting fissures or incisions in the soil of cultivated fields extending into the sub-soil whereby the greatest amount of moisture may be retained in the soil.

This invention is designed especially for use in semi-arid localities to assist in the cultivation of alfalfa and other vegetation, and is designed to cut fissures or incisions in the soil without destroying the roots. In cutting fissures or incisions in the soil, the moisture is permitted to sink into the sub-soil where it is retained to furnish moisture to the vegetation. In this manner the moisture may be retained in the sub-soil for a considerable period of time to be fed to the vegetation during dry periods or periods of drought.

This invention is embodied in the novel arrangement and construction of the cultivator blade and its adjustment with the cultivator beam as hereinafter described and as illustrated in the accompanying drawings, wherein similar reference characters indicate similar parts, and wherein,—

Figure 1 is a perspective view of the cultivator, parts broken away. Fig. 2 is an upper view of the cultivator blade, showing the beam in cross section.

Referring in details to the drawings, a cultivator beam is designated at 20 having the rear end thereof curved downward and the cultivator or sword blade is designated at 5, having the rear portion thereof forked along its length as indicated at 6 and fitting over the front edge of the rear end of the beam 20. This blade is curved to conform with the curve of the rear end of the beam 20 and at its upper end is provided with the ears 7 standing astride the beam 20. A lever 13 is pivoted at an intermediate point by the bolt 14 to the lower end of the beam 20 and at its forward end is pivoted by the bolt 19 to the lower end of the blade 5 between the forked portion 6 thereof. The rear end of the lever 13 has a series of apertures 16 therein, and a bolt 15 is adapted to be passed through the said apertures to secure the rear end of the lever to the beam.

At the upper end of the blade, below the ears 7 are rearwardly projecting straps 8 standing astride the beam 20 having the rear ends screw-threaded. These straps 8 have a series of apertures 18 therein, and a bolt 17 is adapted to be passed through the respective apertures and the beam 20 to secure the upper end of the blade to the beam. A clip or plate 9 is also passed over the rear ends of the straps 8 against the rear edge of the beam 20 and is secured against the said beam by the nuts 10 screw-threaded on the rear end of the said strap.

The nose of the cultivator or sword blade is designated at 11 and the lower end 12 of the said blade is made horizontal to form a shoe upon which the blade rides beneath the surface of the soil. By removing the bolt 15 and swinging the free end of the lever 13 the blade may be either raised or depressed and at the same time be swung forward at its lower end or backward, thus forming a novel adjustment for the said blade with respect to the cultivator beam, it being understood that the upper end of the said blade is first disengaged from the beam to permit the adjustment to be made.

In use, the cultivator beam is drawn over the surface of the soil in the customary manner, and the blade 5 is forced into the soil to extend into the sub-soil and in being drawn forward cuts deep and narrow fissures or incisions in the soil extending into the sub-soil to permit the moisture to descend into the sub-soil. The blade 5 being curved forward at its lower end and being narrow does not destroy the rest of the vegetation, and being forked at its rear end, forces the soil apart to permit the passage of the lower end of the beam and the attached parts without interfering with the soil to destroy the roots. The operator can in this manner go over an alfalfa field and cut numerous fissures or incisions therein which will readily let the moisture descend into the sub-soil for the purpose above stated.

What is claimed as new is:—

The combination with a plow beam curved downward at its rear end, of a curved sword blade arranged in front of the lower end of the said beam, a lever pivoted at an intermediate portion to the lower end of the said beam and pivoted to the lower end of the said blade at its forward end, means for securing the rear end of the said lever to the said beam in its adjusted position, and means for securing the upper end of the said blade to the beam.

In testimony that I claim the foregoing as my own, I have hereto affixed my signature in the presence of two witnesses.

GEORGE C. LETHERMAN.

Witnesses:
   JOHN WALL,
   P. M. POUND.

Copies of this patent may be obtained for five cents each, by addressing the "Commissioner of Patents, Washington, D. C."